(12) United States Patent
Damodaran et al.

(10) Patent No.: US 9,353,300 B2
(45) Date of Patent: May 31, 2016

(54) LEGUME AND/OR OIL SEED FLOUR-BASED ADHESIVE COMPOSITION

(71) Applicant: Wisconsin Alumni Research Foundation, Madison, WI (US)

(72) Inventors: Srinivasan Damodaran, Middleton, WI (US); Dani Zhu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 110 days.

(21) Appl. No.: 14/291,234

(22) Filed: May 30, 2014

(65) Prior Publication Data

US 2014/0352574 A1 Dec. 4, 2014

Related U.S. Application Data

(60) Provisional application No. 61/830,385, filed on Jun. 3, 2013.

(51) Int. Cl.
*C09J 189/00* (2006.01)
*C08H 1/00* (2006.01)

(52) U.S. Cl.
CPC *C09J 189/00* (2013.01); *C08H 1/00* (2013.01)

(58) Field of Classification Search
None
See application file for complete search history.

(56) References Cited

U.S. PATENT DOCUMENTS

| | | | |
|---|---|---|---|
| 7,252,735 B2 | 8/2007 | Li | |
| 2010/0233146 A1* | 9/2010 | McDaniel | A01N 63/02 424/94.2 |
| 2011/0240064 A1* | 10/2011 | Wales | C09D 5/14 134/26 |

OTHER PUBLICATIONS

Phosphorylation of Food Proteins With Phosphorous Oxychloride. Food Chemistry 39 (1991 13-26.*
Phosphorylation of Corn Starch in an Ionic Liquid. Starch 2008.*
High Soy-Containing Water-Durable Adhesives. Escott et al. 2006. J. Adhesion Sciences Technology.*
Wood Adhesion and Adhesives. USDA. Charles Frihart.*
Phosphorylation ofPolysaccharides. Suflet et al., 2006. Science Direct.*
Bian et al., The nature of heme / iron-induced protein tyrosine nitration, *Proc. Natl. Acad. Sci. USA* 2003, 100, 5712-5717.
Bock et al., Bran-induced changes in water structure and gluten conformation in model gluten dough studied by Fourier transform infrared spectroscopy, *Food Hydrocolloids* 2013;31:146-155.
Bulla et al., Non-biological Reduction of Nitrite in Soil, *Nature* 1970, 225, 664.
California Air Resources Board. 2007. Proposed airborne toxic control measure to reduce formaldehyde emissions from composite wood products.
Chapman et al., Characterization of non-covalent oligomers of proteins treated with hypochlorous acid, *Biochem. J.* 2003, 375, 33-40.

(Continued)

*Primary Examiner* — Melvin C Mayes
*Assistant Examiner* — Colette Nguyen
(74) *Attorney, Agent, or Firm* — Joseph T. Leone, Esq.; DeWitt Ross & Stevens S.C.

(57) ABSTRACT

Adhesives made from phosphorylated legume and oil seed flours are described. The adhesive composition includes water and a legume and/or oil seed flour in which at least a portion of ε-amino moieties in lysine residues present in the flour are phosphorylated. An oxidizing agent may also optionally be added to the adhesive composition.

26 Claims, 11 Drawing Sheets

(56) References Cited

OTHER PUBLICATIONS

Choct et al., Soy Oligosaccharides and Soluble Non-starch Polysaccharides: A Review of Digestion, nutritive and Anti-nutritive Effects in Pigs and Poultry, *J Anim Sci* 2010; 23:1386-1398.
Damodaran et al., Dissociation of yeast Nucleoprotein Complexes by Chemical Phosphorylation, *J Agric Food Chem* 1984; 32:1030-1032.
Danner et al., Adhesion of Mussel Foot Protein Mefp-5 to Mica: An Underwater Superglue, *Biochemistry* 2012, 51, 6511-6518.
Dean et al., Biochemistry and pathology of radical-mediated protein oxidation, *Biochem. J.* 1997, 324, 1-18.
Frihart CR. 2005. Wood Adhesion and Adhesives—In: Rowell RM, editor. Handbook of Wood Chemistry and Wood Composites. Boca Raton, LA, USA: CRC Press; 2005. pp. 215-278.
Haemers et al., Cross-Linking and Multilayer Adsorption of Mussel Adhesive Proteins, *Langumir*, 2002, 18, 4903-4907.
Hall et al., Observations on the Use of 2,4,6-Trinitrobenzenesulphonic Acid for the Determination of Available Lysine in Animal Protein Concentrates, *Analyst* 1973; 98:673-686.
Hirotsuka et al., Functionality and Digestibility of a Highly Phosphorylated Soybean Protein, *Agric Biol Chem* 1984; 48:93-100.
Huang et al., A New Soy Flour-Based Adhesive for Making Interior Type II Plywood, *J Amer Oil Chem Soc* 2008; 85:63-70.
Huang et al., A new soy flour-polyepoxide adhesive system for making interior plywood, *Holzforschung* 2012; 66:427-431.
Hwang et al., Chemical Modification Strategies for Synthesis of Protein-Based Hydrogel, *J Agric Food Chem* 1996; 44:751-758.
Hwang et al., Equilibrium Swelling Properties of a Novel Ethylenediaminetetraacetic Dianhydride (EDTAD)-Modified Soy Protein Hydrogel *J Applied Polymer Sci* 1996; 62:1285-1993.
Hwang et al., Metal-Chelating Properties and Biodegradability of an Ethylenediaminetetraacetic Acid Dianhydride Modified Soy Protein Hydrogel, *J Applied Polymer Sci* 1997; 64:891-901.
Iman et al., Effect of Crosslinker and Nanoclay on Jute Fabric Reinforced Soy Flour Green Composite, *J Applied Polymer Sci* 2012; 27:3987-3996.
Jang et al., A new formaldehyde-free wood adhesive from renewable materials, *Int J Adhesion & Adhesives* 2011; 31:754-759.
Kitabatake et al., Therma Denaturation of Soybean Protein at Low Water Contents, *Agric Biol Chem* 1990; 54:2205-2212.
Kumar et al., $HNO_3/H_5PO_4$-$NANO_2$ mediated oxidation of cellulose—preparation and characterization of bioabsorbable oxidized celluloses in high yields and with different levels of oxidation, *Carbohydrate Polym.* 2002, 48, 403-412.

Lee et al., Effects of Phosphoramides on Wood Dimensional Stability, *Taiwan Forestry Sci* 2000; 15:137-145.
Li et al., Investigation of Soy Protein-Kymene® Adhesive Systems for Wood Composites, *J Amer Oil Chem Soc* 2004; 81:487.
Liu et al., Communication: Mussel Protein is a strong and water-resistant adhesive, *Macromol Rapid Commun* 2002; 23:739-742.
Liu et al., Modification of Soy Protein for Wood Adhesives using Mussel Protein as a Model: The Influence of a Mercapto Group, *Macromol Rapid Commun* 2004; 25:1831838.
Liu et al., Development and characterization of adhesives from soy protein for bonding wood, *Int J Adhesion & Adhesives* 2007; 27:59-67.
Matheis G., Phosphorylation of Food Proteins with Phosphorus Oxychloride—Improvement of Functional and Nutritional Properties: A Review, *Food Chem* 1991; 39:13-26.
Ogata N., Denaturation of Protein by Chlorine dioxide: Oxidative Modification of Tryptophan and Tyrosine Residues, *Biochemistry* 2007, 46, 4898-4911.
Pagliaro M., Autocatalytic oxidations of primary hydroxyl groups of cellulose in phosphoric acid with halogen oxides, *Carbohydr. Res.* 1998, 308, 311-317.
Stewart et al., the tube cement of *Phragmatopoma californica*: a solid foam, *J Exp Biol* 2004; 207:4724734.
Suflet et al., Phosphorylation of polysaccharides: New results on synthesis and characterization of phosphorylated cellulose, *Reactive & Functional Polymers* 2006; 66:1240-1249.
Sun et al., Halogenated DOPA in a Marine Adhesive Protein, *J Adhes* 2009; 85:126.
Utsumi et al., Structure-function Relationships of Soy Proteins—In *Food Proteins and their Applications*, (Damodaran, S.; Paraf, A.; Eds.); Marcel Dekker, Inc., New York, 1997; pp. 257-291.
Wei et al., Hydrophobic Enhancement of Dopa-Mediated Adhesion in a Mussell Foot Protein, *J. Am. Chem. Soc.* 2013, 135, 377-383.
Wescott et al., High-soy-containing water-durable adhesives, *J Adhesion Sci Technol* 2006; 20:859-873.
Wescott et al., Sticking power from soya beans, *Chemistry & Industry*; Feb. 7, 2011: 21-23.
Woo et al., Chemical Phosphorylation of Bovive β-Lactoglobulin, *J Agric Food Chem* 1982; 30:65-70.
Xie et al., Phosphorylation of Corn Starch in an Ionic Liquid, *Starch* 2009; 61:702-708.
Zhao et al., Glycobiology and Extracellular Matrices: Cement Proteins of the Tube-building Polychaete *Phragmatopoma californica*, *J Biol Chem* 2005; 280:42938-42944.

* cited by examiner

LEGUME AND/OR OIL SEED FLOUR-BASED ADHESIVE COMPOSITION

CROSS-REFERENCE TO RELATED APPLICATIONS

Priority is claimed to provisional application Ser. No. 61/830,385, filed Jun. 3, 2013, which is incorporated herein by reference.

BACKGROUND

Urea-formaldehyde and phenol-formaldehyde adhesives, both of which are derived from petroleum, have been widely used in the fabrication of interior plywood and particle board for decades. These synthetic adhesives are cheap, easy to use, have long pot lives, and very good adhesive performance. However, formaldehyde emissions from these adhesives pose potential hazards to the environment and to human health. Thus, the U.S. has enacted a law that effectively implements the stringent formaldehyde emission levels set by the California Air Resource Board [1] as a national standard. The Formaldehyde Standards for Composite Wood Products Act (15 U.S.C. Chapter 53, Sub-Chapter VI) went into effect nationwide in the United States on Jan. 1, 2013. While there are certain exemptions and phase-out periods included in the law, there is a critical, regulation-driven need to develop adhesives that perform at least as well as urea-formaldehyde and phenol-formaldehyde adhesives, but which do not emit formaldehyde or any other dangerous gases. An additional benefit would be if such an adhesive could be derived from renewable resources, rather than from fossil fuels.

Soy protein isolate (SPI) has been investigated for use as a wood adhesive. A host of modifications have been made to SPI in attempts to improve its adhesive qualities. For example, SPI has been modified to introduce moieties including phenol [2, 3], thiol[4], maleyl [5], amino [6], and hydroxyl [7, 8]. These efforts have not yielded encouraging results. Use of the cross-linking agent polyamidoamine-epichlorohydrin (PAE) as an additive to SPI has been shown to produce a soy flour adhesive with acceptable water resistance in plywood [9, 10]. The improved water resistance of soy flour-PAE adhesive is attributable entirely to the PAE and reaches a maximum value at about 5 wt % PAE (20 wt % of total dry solids) in the formulation [11]. Notably, however, PAE is also derived from petroleum.

Thus, the problem remains that these prior art modifications all rely upon petroleum-based solvents and chemicals to improve the adhesive performance of SPI-based and soy flour-based adhesives. Moreover, it is unknown whether these petroleum-based additives also outgas harmful vapors over time. There thus remains a long-felt and unmet need for a simpler, non-petroleum-based "green" chemical modification strategy to transform soy flour into a form that will yield an adhesive with acceptable dry binding strength and water resistance.

SUMMARY OF THE INVENTION

Caseins and marine adhesive proteins (MAP) possess good adhesive properties and acceptable water resistance. In contrast, unmodified SPI, soy flour, other legume flours, and oil seed flours (e.g., flax seed flour, canola seed flour) do not yield acceptable adhesives. The present inventors thus investigated the structural features and chemical properties of caseins and MAPs, and compared these features to those found in SPI and soy flour. It was found that caseins are highly disordered phosphoproteins with several phosphate groups attached to serine and threonine residues. MAPs contain anionic and cationic protein fractions: the anionic proteins contain a high mole percent of phosphoserine (>40%), while cationic proteins contain about 20% lysine residues [12-14]. Thus, the present inventors hypothesized that a disordered structural state and a copious number of protein-bound phosphate groups might be two important structural attributes responsible for the good adhesive properties of these proteins. Conversely, it was hypothesized that perhaps proteins in general might be transformed into better adhesives through chemical phosphorylation. The inventors' hypothesis was put to the test by studying the effect of chemical phosphorylation on the adhesive strength and water resistance of soy flour-based adhesives. The resulting compositions of matter were found to be acceptable substitutes for conventional urea-formaldehyde and phenol-formaldehyde adhesives.

Thus, disclosed herein is an adhesive composition comprising water and legume and/or oil seed flour (preferably soy flour) in which at least a portion of $\epsilon$-amino moieties in lysine residues present in the soy flour are phosphorylated. In general, at least about 50% of the lysine residues present in the soy flour are phosphorylated. It is more preferred that at least 60%, or 70%, or 80%, or 90% of the lysine residues present in the flour are phosphorylated.

The adhesive composition may optionally comprise an oxidizing agent. Any oxidizing agent that drives the formation of cross-linking bonds in the phosphorylated soy flour may be used. Suitable oxidizing agents include halite ion, halate ion, perhalate ion, hypohalite ion, nitrate ion, or nitrite ion. Thus, suitable oxidizing agents include chlorite ion, chlorate ion, perchlorate ion, and hypochlorite ion, along with their other halogen analogs. As in the version absent the oxidizing agent, anywhere from at least about 50% to at least about 90% of the lysine residues present in the soy flour are phosphorylated.

Phosphorylation of the flour yields salts that may optionally be removed from the adhesive composition or their concentration reduced. This can be accomplished by any means now known or developed in the future, such as dialysis/diafiltration.

Also disclosed herein is a corresponding method for making an adhesive composition. The method comprises phosphorylating the flour to yield phosphorylated flour and fabricating an aqueous-based adhesive composition from the phosphorylated flour. Again, anywhere from at least about 50% to at least about 90% of the lysine residues present in the flour are phosphorylated. An oxidizing agent as noted above may also be added to the formulation. Also, the salts formed via the phosphorylation reaction may optionally be removed or reduced in concentration.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present composition and method shall include the corresponding plural characteristic or limitation, and vice-versa, unless otherwise specified or clearly implied to the contrary by the context in which the reference is made. Unless otherwise noted, all percentages (%) are by weight.

All combinations of method or process steps as used herein can be performed in any order, unless otherwise specified or clearly implied to the contrary by the context in which the referenced combination is made.

The compositions and methods described herein can comprise, consist of, or consist essentially of the essential elements and limitations of the composition or method described, as well as any additional or optional ingredients, components, or limitations described herein or otherwise useful in formulating adhesive compositions.

BRIEF DESCRIPTION OF THE DRAWINGS

FIG. 5A depicts the wet and dry adhesion strength of PSF0.15 samples at various soy flour solids content. FIG. 5B depicts the wet and dry adhesion strength of SF samples at various soy flour solids content. (See the Examples for complete details of the formulations tested.) In both figures, the solids content on the x-axis is expressed as total soy flour solids in the adhesive formulations.

DETAILED DESCRIPTION

Figure 1:
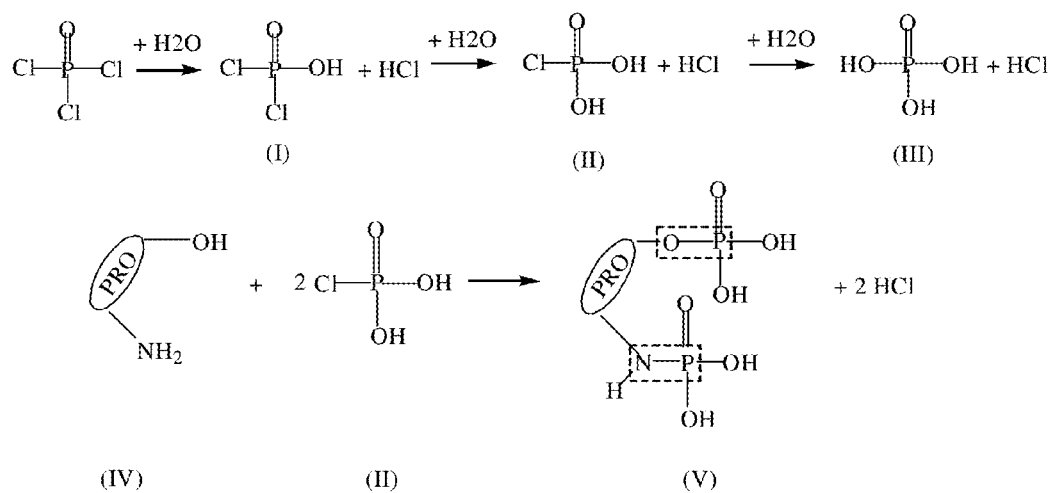
FIG. 1: Reaction of $POCl_3$ with proteins. The dashed rectangles denote newly formed bonds. PRO=Protein.

As noted above, disclosed herein is an adhesive composition comprising water and a legume flour or an oil seed flour in which at least a portion of $\epsilon$-amino moieties in lysine residues present in the soy flour are phosphorylated. It has been found, quite unexpectedly, that phosphorylating the flour greatly improves its adhesion characteristics, both when wet and when dry. The bonding characteristics of the adhesive formulation can be improved by adding an oxidizing agent to the formulation.

As used herein, the term "legume" means any plant in the family Fabaceae or Leguminosae, or the fruit or seed of such plant, and includes examples such as peas, beans, lentils, lupins, mesquite, carob, soybeans, peanuts, alfalfa, clover, and the like. The term "oil seed" is used herein to denote any plant or the seed of such plant that is conventionally cultivated (or could be cultivated) for oil production, and includes, without limitation flax seeds, canola seeds, sesame seeds, safflower seeds, sunflower seeds, and the like.

By way of definition, the chlorite ion, or chlorine dioxide anion, is $ClO_2^-$. The chlorine is in the +3 oxidation state. As used herein a "chlorite" refers to a compound that contains this ion or yields the chlorite ion when added to aqueous solution. Non-limiting examples include sodium chlorite, $NaClO_2$, magnesium chlorite, $Mg(ClO_2)_2$, etc. The other halogens form analogous compounds and are referred to herein as "halites."

The chlorate ion has the formula $ClO_3^-$. The chlorine atom is in the +5 oxidation state. As used herein a "chlorate" refers to a compound that contains this ion or yields the chlorate ion when added to aqueous solution. Non-limiting examples include potassium chlorate ($KClO_3$), sodium chlorate ($NaClO_3$), magnesium chlorate ($Mg(ClO_3)_2$), and the like. The other halogens form analogous compounds and are referred to herein as "halates."

The hypochlorite ion, also known as chlorate(I) anion, has the formula $ClO^-$. The chlorine atom is in the +1 oxidation state. As used herein a "hypochlorite" refers to a compound that contains this ion or yields the hypochlorite ion when added to aqueous solution. Non-limiting examples include sodium hypochlorite, calcium hypochlorite, etc. The other halogens form analogous compounds and are referred to herein as "hypohalites."

The perchlorate ion has the formula $ClO_4^-$. As used herein a "perchlorate" refers to a compound that contains this ion or yields the perchlorate ion when added to aqueous solution. Non-limiting examples include ammonium perchlorate, potassium perchlorate, lithium perchlorate, and the like. The other halogens form analogous compounds and are referred to herein as "perhalites."

The nitrate ion ($NO_3^-$) is derived from nitric acid and its corresponding salts. The nitrite ion ($NO_2^-$) is derived from nitrous acid its corresponding salts, such as sodium nitrite ($NaNO_2$), ammonium nitrite ($NH_4NO_2$), etc.

The adhesive composition and how to make it are best disclosed by way of the following examples:

Example 1

Phosphorylation of Soy Flour; Adhesive Compositions Comprising Phosphorylated Soy Flours Materials:

Defatted soy flour (SF) (Prolia™ 200/90) was obtained from Cargill, Inc. (Cedar Rapids, Iowa). The SF contained 51.6% crude protein, 4.5% moisture, 7.2% ash, 0.6% fat, and 36.0% carbohydrates. Phosphorus oxychloride ($POCl_3$, >99.0%), 2,4,6-trinitrobenzenesulfonic acid (TNBS), and L-lysine (anhydrous) were purchased from Sigma-Aldrich (Milwaukee, Wis.). Calcium chloride anhydrates and diethyl ether (anhydrous) were from Fisher Scientific (Pittsburgh, Pa.). All other chemicals used were reagent grade from Sigma-Aldrich.

Phosphorylation of SF:

A 15% w/w dispersion of SF in water at pH 10.5 was stirred for 60 min at 60° C. in order to partially denature the proteins. Phosphorylation was performed at room temperature according to a literature protocol [15, 16]. Briefly, a calculated amount of $POCl_3$ was added in small aliquots to the pre-treated SF dispersion with vigorous stifling. The pH was maintained at about 10.0 to 10.5 by adding 10 N NaOH. The reaction was completed within 1 h. Varying the $POCl_3$-to-SF weight ratio from 0 to 0.3 at 0.05 increments (dry weight basis) varied the degree of phosphorylation of SF. The phosphorylated SF was stirred for another hour at room temperature. The pH of the phosphorylated SF (PSF) dispersion was then adjusted to 8.0 and the product freeze-dried. The extent of phosphorylation at various $POCl_3$-to-SF ratios was expressed as the percent of total lysine residues modified in SF. The PSF was stored at room temperature until used.

Lysine Determination:

The lysine content of unmodified and phosphorylated SF was determined using the trinitrobenzene-sulfonic acid (TNBS) method [17]. Briefly, to 1 mL of 4% $NaHCO_3$ was added 0.8 mL of a solution containing less than 5 mg of protein, followed by the addition of 0.2 mL of TNBS solution (12.5 mg/mL). The mixture was incubated at 40° C. for 2 h, and 3.5 mL of concentrated HCl was added. The tube was sealed and kept at 110° C. for 3 h and then, after cooling, the volume was made up to 10 mL with deionized water. The solution was extracted twice with anhydrous diethyl ether. The tube was unsealed and held at 40° C. to allow the residual ether to evaporate. The absorbance of the yellow ($\epsilon$-TNP lysine) solution was measured at 415 nm against a blank. The amounts of reactive lysyl residues in the phosphorylated and unphosphorylated soy proteins were determined from the standard curve constructed using lysine.

Attenuated Total Reflection Fourier Transform Infrared (ATR-FTIR) Spectroscopy:

ATR-FTIR spectra were collected using a Nicolet iN10-model instrument (Thermo Scientific, Madison, Wis.) with a liquid $N_2$ mercury cadmium telluride (MCT) detector. The dried sample powders (SF and PSF) were loaded onto a gold plate and pressed by a germanium crystal accessory. Each ATR-FTIR spectrum was recorded as an average of 64 scans at a resolution of 4 $cm^{-1}$ at 23° C. The air absorbance background was subtracted from the sample scans.

Preparation of SF and PSF Adhesives:

The PSF samples contained significant amounts of salt (mainly $Na_3PO_4$ and NaCl) formed during the phosphorylation reaction. The salt content of PSF samples (determined on the basis of ash content of the PSF samples) varied depending on the $POCl_3$-to-SF ratio used in the phosphorylation step. To normalize the salt content, all adhesive formulations were prepared on the basis of soy flour solids content. PSF powder was mixed thoroughly into a paste with a calculated amount of deionized water at room temperature and the pH was adjusted to about 8.0.

Shear Strength Measurement:

The bonding strength of SF and PSF adhesives with wood was determined by using an Automated Bond Evaluation System (ABES) (Model 311c tester, Adhesive Evaluations Systems Inc., Corvallis, Oreg.). Maple veneer (Columbia Forest Products, Old Fort, N.C.) was used for these tests. The veneers (0.8 mm thick) were equilibrated at 21° C. and 50% relative humidity for at least 24 h and cut into 11.7 cm along-the-grain×2 cm across-the-grain strips. The adhesive was applied to one wood specimen and then immediately overlapped with another veneer so that the overlap area was 0.5 cm×2.0 cm. The glued area was then hot pressed on the ABES unit at 0.186 MPa at 120° C. for 2 min. After pressing, the samples were allowed to re-equilibrate at 21° C. and 50% relative humidity for at least overnight before shear strength testing. To measure dry shear strength, the sample was mounted on the ABES unit and the grips were pulled and the maximum load at failure was recorded. The shear strength (MPa) was calculated by dividing this load by the adhesive overlap area of 1.0 $cm^2$. To measure the wet shear strength, samples were soaked in tap water for four hours at 21° C. prior to testing on the ABES unit. At least five replicates were performed for each adhesive formulation.

Proximate Analysis:

Protein content was measured by the conventional and well known Biuret method. Based on this analysis, the protein content of SF was 48.6%, as contrasted to 51.6% crude protein. The moisture content of each sample was determined by heating the samples overnight in an oven at 102° C. The ash content was determined by ashing at 550° C. Crude carbohydrate content was estimated by subtracting all other components from the total mass.

Data Analysis:

All values of the mechanical properties measured are means of five (5) replicates. The data in each figure are the mean value of three (3) to five (5) replicates. One-way Analysis of variance (ANOVA) was used to analyze the data, and either Tukey-Kramer HSD or Dunnett'S method (JMP Pro10, SAS Institute Inc., Cary, N.C.) were used to compare the means. The confidence level was 95%.

Results and Discussion

Example 1

Chemical phosphorylation had been studied to improve functionalities, such as solubility, viscosity, and gelling properties of both proteins and starch [16, 18, 19]. Phosphorus oxychloride ($POCl_3$) is an economical and practical reagent for protein phosphorylation in large-scale production. In the phosphorylation reactions performed here, $POCl_3$ and its two intermediates (I) and (II) react with amino groups (lysine, histidine) and hydroxyl groups (serine, threonine, tyrosine) in proteins [19] as shown in FIG. 1. ("PRO" in FIG. 1 refers to the bulk soy flour protein molecules, rather than a proline residue.) In addition to proteins, SF contains about 35% carbohydrates [20], including mono- and disaccharides, glycans, and cellulose. It is believed that the insoluble carbohydrates (~25% of total carbohydrates in SF) play a minor role in the adhesive properties of SF. The soluble carbohydrates (~25% of total carbohydrates in SF) are detrimental to adhesive properties because they increase water absorption and thereby decrease the water resistance of soy flour-based adhesives [21]. Carbohydrates such as cellulose, curdlan, and dextran can be phosphorylated using phosphorylating agents, predominantly at the C-6 hydroxyl group [22]. Thus, without being limited to any specific underlying mechanism, it may be that reaction of $POCl_3$ with SF results in phosphorylation of both proteins and polysaccharides in SF. Other phosphorylating agents may also be used to phosphorylate the flour, such as sodium tripolyphosphate, sodium trimetaphosphate, phosphorus pentoxide, diphosphoimidazole, acetyl phosphate, pyrophosphate, etc. The desired outcome is phosphorylation of the flour; the reagent used to achieve the phosphorylation is not critical. $POCl_3$ was used as an example because of its ready availability and low cost.

Figure 2:
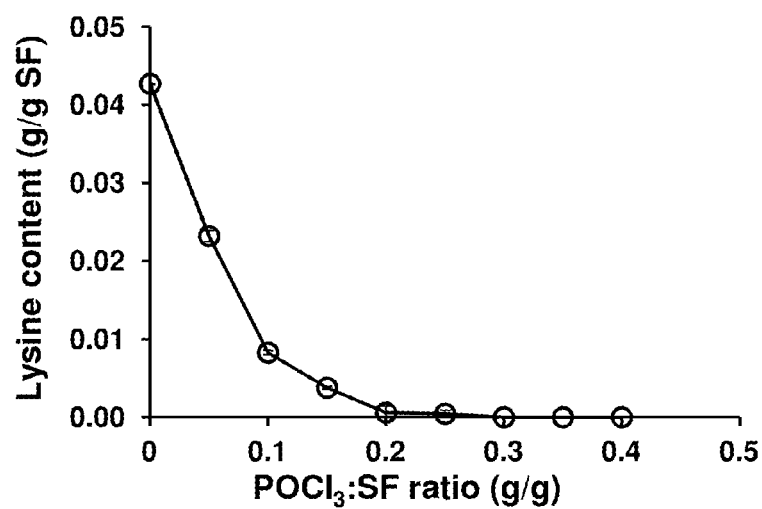
FIG. 2: The effects of $POCl_3$:SF ratio on the extent of phosphorylation of lysine residues in soy flour. SF=soy flour.

Extent of Phosphorylation:

Although several reactive groups in both proteins and polysaccharides in SF may participate in the phosphorylation reaction, the extent of phosphorylation was determined from the percentage loss of the reactive $\epsilon$-amino group in lysine residues in SF after the phosphorylation reaction. As shown in FIG. 2, which is a graph plotting the $POCl_3$:SF ratio to lysine content, the reactive lysine content of SF decreased as the ratio of $POCl_3$-to-SF (g/g) was increased in the reaction. More than 91% of lysine residues in SF were phosphorylated at a $POCl_3$:SF ratio of 0.15 (g/g), and almost 100% of lysine residues were phosphorylated at a $POCl_3$:SF ratio of 0.2 (g/g).

The mass balance of $POCl_3$ reaction with SF at various $POCl_3$:SF ratio is shown in Table 1. The difference between the final weight of the PSF and the initial weight of SF represent the mass of salt ($Na_3PO_4$ and NaCl) formed during the reaction at pH 10 to 10.5. No attempt was made to remove the salt from the final product.

TABLE 1

Composition of Phosphorylated Soy Flour

| $POCl_3$:SF ratio (g/g) | Initial SF (g) | Final PSF (g) | Net increase (g) | True Protein (%) |
| --- | --- | --- | --- | --- |
| 0.00 | 30.0 | 30.0 | 0.0 | 45.8 |
| 0.05 | 30.0 | 32.4 | 2.4 | 42.4 |
| 0.10 | 30.0 | 36.0 | 6.0 | 38.2 |
| 0.15 | 30.0 | 38.2 | 8.2 | 36.0 |
| 0.20 | 30.0 | 42.0 | 12.0 | 32.7 |
| 0.25 | 30.0 | 44.0 | 14.0 | 31.2 |
| 0.30 | 30.0 | 47.9 | 17.9 | 28.7 |

Figure 3:
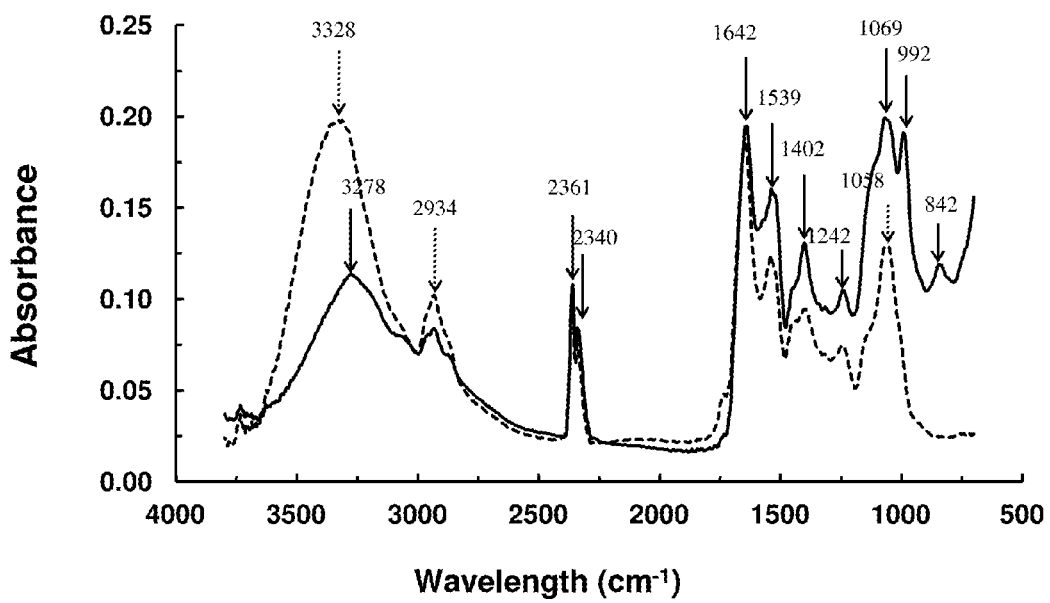
FIG. 3: The attenuated total reflectance—Fourier transform infrared (ATR-FTIR) spectra of SF (dot line) and PSF0.15 (solid line) dry samples. PSF=phosphorylated soy flour.

ATR-FTIR Spectra:

To identify the groups in SF phosphorylated by $POCl_3$ (in addition to lysine residues), the ATR-FTIR spectrum of the freeze-dried sample phosphorylated at the $POCl_3$:SF ratio of 0.15 (PSF0.15) was analyzed. FIG. 3 shows the ATR-FTIR spectra of SF and PSF0.15 samples. The SF spectrum is characterized by a strong broad band centered at 3328 $cm^{-1}$, attributed mainly to OH stretching of water and to some extent from N—H (amide A) stretching. The band centered at 2934 $cm^{-1}$ is attributed to O—H and $CH_2$ stretching of carbohydrates and the band centered at 1642 $cm^{-1}$ (Amide I) is due to C=O stretching and N—H bending of peptide bonds and a minor contribution from O—H bending vibration. The band centered at 1539 $cm^{-1}$ is ascribed to the bending of N—H of amide II; the band at 1242 $cm^{-1}$ is C—N stretching of amide III and the band at 1058 $cm^{-1}$ is due to C=O and C-0 stretching of the $\beta$-(1→4)-glucosidic bond (C—O—C) in carbohydrates. The shoulder at 1735 $cm^{-1}$ is due to the C=O stretching vibration of ester groups of carbohydrates.[22-24]

The FTIR spectrum of the PSF0.15 sample was mostly similar to that of SF, but differed at three regions: The OH stretch band of water at 3328 $cm^{-1}$ in SF red-shifted to lower frequency at 3278 $cm^{-1}$. Such a red shift to lower frequency (higher wavelength) and a reduction in absorption intensity generally occurs when water is tightly bound to polymeric materials [25]. In the PSF0.15 sample, this might be due to water (moisture content=5.2%) tightly bound to the newly introduced phosphate groups via ion-dipole interactions. Most strikingly, the FTIR spectrum of PSF0.15 contained two new peaks at 992 $cm^{-1}$ and 842 $cm^{-1}$, which were not present in the FTIR spectrum of SF (FIG. 3). The peak at 992 $cm^{-1}$ belongs to P—N stretching and the peak at 842 $cm^{-1}$ is attributed to P—O stretching [22, 26]. Undoubtedly, the P—N bond arises from phosphorylated lysine and histidine residues of soy proteins in PSF0.15. Likewise, the P—O stretching might be from phosphorylated hydroxyl groups of serine, threonine, and tyrosine residues of soy proteins in PSF0.15 as well as from phosphorylated hydroxyl groups (at the C-6 position) of carbohydrates in PSF0.15.

Figure 4:
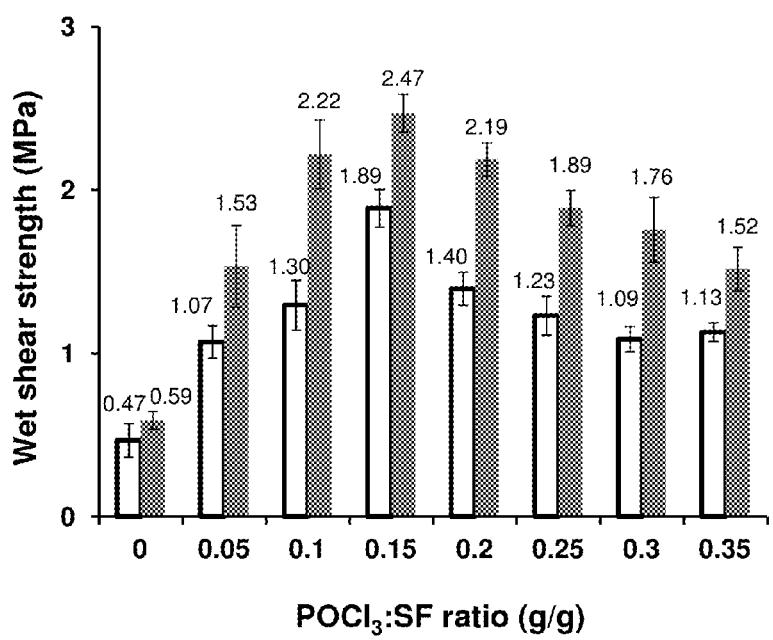
FIG. 4: The effects of the extent of phosphorylation on the wet shear strength of soy flour adhesive. The open bars represent wet shear strength of phosphorylated SF (PSF) without desalting, and the filled bars represent wet adhesion strength after dialysis of PSF to remove salts formed during the phosphorylation reaction. The protein content in all these adhesive formulations was 12% (w/w).

Adhesive Strength of the Phosphorylated SF:

The effect of phosphorylation of SF on the wet strength of PSF adhesives, as measured by the ABES test, is shown in FIG. 4. The open bars represent wet shear strength of without desalting; the filled bars represent wet adhesion strength after dialysis of PSF to remove salts formed during the phosphorylation reaction. In all of these formulations, the soy flour solids content was maintained at 25% w/w, regardless of the salt content of the samples. The wet adhesive strength of unmodified SF was typically <0.5 MPa. The wet adhesive strength progressively increased as the extent of phosphorylation was increased and reached a maximum value of 1.89 MPa at a $POCl_3$:SF ratio of 0.15 g/g (corresponding to 91% phosphorylation; FIG. 2). The wet adhesive strength decreased at $POCl_3$:SF ratios greater than 0.15. Without being limited to any given mechanism of action, these results may indicate that either some residual amount of reactive lysine residues is required for better bonding reaction, or excessive phosphorylation of hydroxyl groups of carbohydrates resulted in repulsive electrostatic interactions and/or excessive hydration of the adhesive. It also seems likely that the excess amount of salt in PSF samples (Table 1) at $POCl_3$:SF ratios >0.15 (g/g) also might have affected the wet strength of the PSF adhesives.

In order to check the latter possibility, the PSF samples prepared at various $POCl_3$:SF ratio conditions were dialyzed using 6-8 kDa nominal molecular weight cut-off dialysis membrane, and the wet strength of the desalted PSF adhesives at 25% soy flour solids content was tested and the results are shown in FIG. 4 (solid bars). It should be noted that removal of salts from PSF by dialysis significantly increased (about 32% in the case of PSF0.15) the wet adhesion strength. However, the desalted PSF samples also exhibited maximum wet strength at the extent of phosphorylation corresponding to the $POCl_3$:SF ratio of about 0.15 to about 0.2 (g/g), indicating that factors other than salts were responsible for the maximum in the wet strength vs the extent of phosphorylation profile. Because desalting of PSF samples by dialysis or diafiltration is a costly proposition in practical applications, subsequent tests on the wet strength were done only on the undialyzed PSF0.15 sample. The typical composition of PSF0.15 was 38.2% protein, 34.3% carbohydrates, 0.5% fat, 20.7% ash, and 5.2% moisture.

Figure 5A:
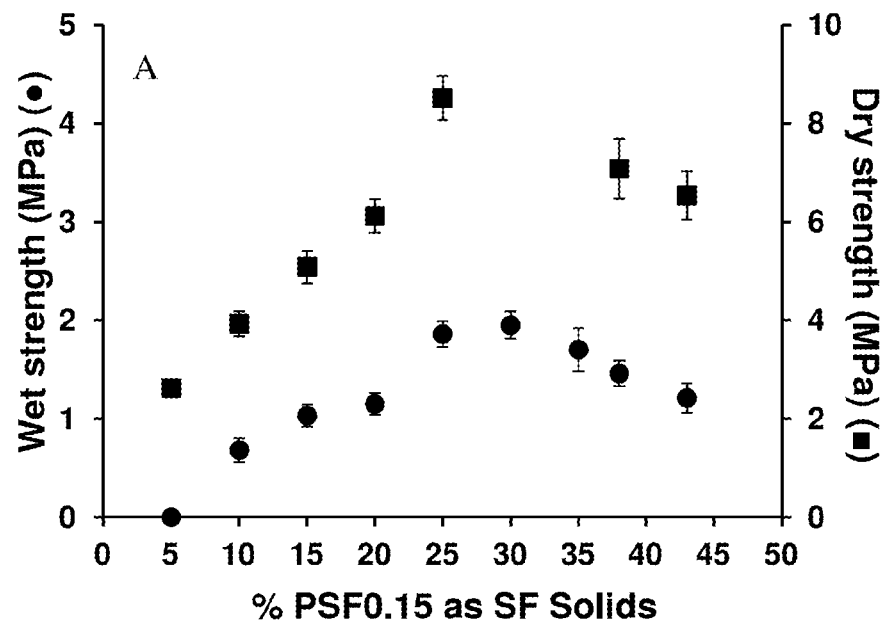
FIGS. 5A and 5B.

Adhesive Strength of PSF0.15:

The wet adhesion strength of PSF0.15 at various concentrations is shown in FIG. 5A (-●-). Because the salt content of PSF0.15 was 20.7% on dry basis, for comparative purposes the PSF0.15 concentration in FIG. 5A is expressed in terms of total SF solids in PSF0.15. The wet strength increased almost linearly and reached a plateau value of 1.86 MPa at 25-30% total SF solids of PSF0.15 in the formulation. The wet strength decreased at higher PSF0.15 concentrations, which might be due to the high viscosity of the adhesive paste, which might limit penetration of the adhesive into wood fibers. A similar trend was observed for the dry strength. (See FIG. 5A, -■-). The maximum dry strength of PSF0.15 was 8.52 MPa at 25% SF.

In contrast, the wet strength of unmodified SF adhesive was very poor at all SF solids concentration studied. See FIG. 5B, (-●-). In most cases, the test samples fell apart after 4 h soaking in tap water. The dry strength of unmodified SF adhesive (FIG. 5B, -■-) increased with SF solids concentration and reached the highest value of 5.9 MPa at 25% SF solids, and decreased at higher concentrations. A soy flour sample that had been denatured at alkaline pH 10.5 for 60 min at 60° C. had a wet strength of 0.7 MPa and a dry strength of 6.4 MPa (data not shown).

Figure 5B:
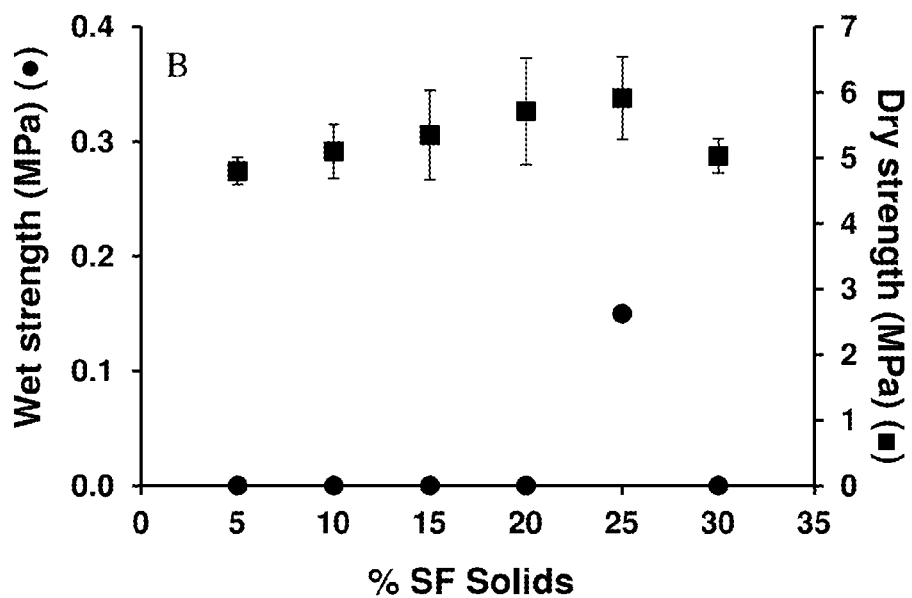

The results shown in FIGS. 5A and 5B clearly indicate that introducing phosphate groups into proteins (and possibly into carbohydrates) in SF dramatically increased the wet strength of the resulting adhesive composition. The maximum increase in the wet strength occurs at phosphorylation of about 90% of the lysine residues in SF. The fact that alkali denaturation of SF did not significantly improve its wet adhesion strength (data not shown) suggests that the higher wet strength of PSF was primarily due to the phosphate groups attached to the proteins per se rather than phosphorylation-induced unfolding of proteins. Depending on the ionized or unionized state of phosphate groups in the glued state in wood, they might interact with wood surfaces either via electrostatic or hydrogen bonding interactions. It is also likely that at the high pressure and temperature employed during pressing in the ABES test (0.186 MPa and 120° C. for 2 min), the phosphate groups might be esterified to the hydroxyl groups at the C-6 positions in wood cellulose, forming cross-links between wood pieces. In addition, if some of the phosphate groups attached to proteins were in the intermediate forms (—$POCl_2$ and —$HPO_2Cl$) after the phosphorylation reaction, these highly reactive groups would readily form phosphoester bonds with hydroxyl groups of cellulose in wood fibers.

Figure 6:
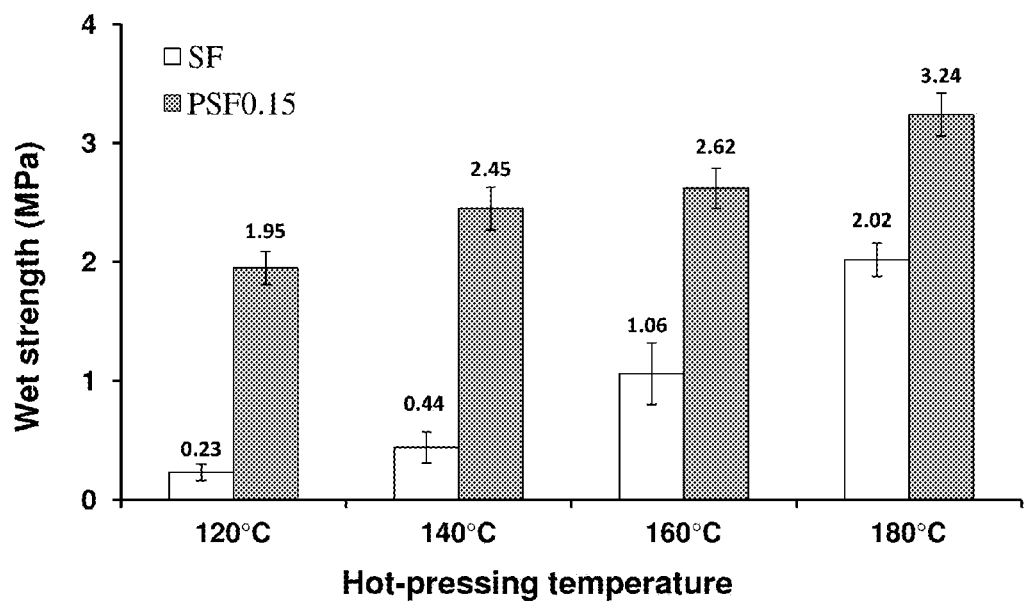
FIG. 6: Effect of pressing temperature on the wet adhesion strength of SF (open bars) and PSF0.15 (filled bars) adhesives formulations. The total soy flour solids content in all the samples was constant at 25 wt %.

Effect of Hot-Press Temperature on Wet Strength of PSF0.15:

The temperature employed during the hot pressing step is an important factor for bio-based adhesives because the protein unfolding reactions and chemical cross-linking reactions are temperature-dependent. The effect of pressing temperature on the wet strength of SF (open bars) and PSF0.15 (filled bars) adhesives is shown in FIG. 6. The total soy flour solids content in all the samples was held constant at 25 wt %. The wet strength of both SF and PSF0.15 adhesives increased with increasing temperature from 120° C. to 180° C. The wet strength of PSF0.15 increased from 1.86 MPa at 120° C. to about 3.2 MPa at 180° C., whereas the wet strength of SF increased from 0.25 MPa at 120° C. to about 2.0 MPa at 180° C.

Pressing temperature had a greater net impact on the wet strength of SF than PSF0.15. This suggests that the extent of unfolding was greater for SF than for PSF0.15 in the temperature range employed. However, it is also possible that even at 180° C. the proteins in SF might not have been fully denatured because of the rapid loss of moisture during the 2-minute pressing time. Without being limited to any underlying mechanism, the loss of moisture might have elevated the denaturation temperature of the proteins. Using differential scanning calorimetry, Kitabatake et al. [27] observed that the denaturation temperature was 118.7° C. for 7S globulins and 149° C. for 11S globulins of SPI at 47% water content, and only one endothermic peak at 190° C. was observed at 11% water content. Thus, dynamic changes in the water content of the adhesive film during a 2-min hot press at 120° C. might affect the extent of denaturation of the proteins in SF and thereby its adhesive strength. Regardless of the exact mechanism, the wet strength of SF was still below the American National Standard for Hardwood and Decorative Plywood (ANSHDP)-recommended level even at 180° C. pressing temperature, whereas the wet strength of PSF0.15 approached the acceptable level 180° C.

Simple chemical modification strategies have been used in the past to transform soy proteins into industrial products, such as hydrogels [28-30]. The results of this example demonstrate that the adhesive properties, notably the wet shear strength, of soy flour can be dramatically improved by chemical phosphorylation of proteins (and probably the carbohydrates) in soy flour. Because no organic solvents or petroleum-derived chemicals were used in the modification step, the method offers a green chemistry approach to produce plant protein-based wood adhesives.

It is generally accepted in the industry that adhesives displaying a wet shear strength of about 3.0 MPa in the ABES test at hot-press conditions 120° C. for 2 min are acceptable for use in the fabrication of interior plywood and particleboards. For instance, an adhesive formulation containing 25 g SF+1.5 g PAE+73.5 g water had a wet shear strength of about 2.76 MPa in the ABES test under the above hot press conditions. A similar formulation is currently used in commercial manufacture of interior plywood. The PSF0.15 adhesive formulation containing 25% SF solids (~12.5% protein) reported here had a wet shear strength of 1.89 MPa. When 1.4% $CaCl_2$ was included in the formulation as an ionic cross-linker, the wet shear strength of PSF0.15 increased to 2.13 MPa (data not shown). This suggests that phosphorylation essentially negated the need for adding PAE. At hot-press temperatures above 160° C., the wet strength of PSF0.15 in the ABES test reached a level acceptable for plywood and particleboard. With additional targeted green chemical treatments, it is possible to further improve the wet strength of PSF0.15. $POCl_3$ is a low cost, general-purpose reagent and it is used in the production of modified starch (di-starch phosphate) in food applications. Thus, PSF-based adhesive is expected to be low cost and environmentally safe.

Conclusions for Example 1

Chemical phosphorylation of SF using $POCl_3$ as the phosphorylating agent dramatically increased the wet adhesion strength of SF. The optimum $POCl_3$:SF ratio that produced maximum wet adhesion strength was about 0.15 (g/g). The increase in wet adhesion strength of PSF0.15 was mostly attributed to the phosphate groups incorporated into the proteins and carbohydrates, and to a less degree to phosphorylation-induced protein denaturation in PSF. It is believed that the attached phosphate groups acted as cross-linking agents, either via covalent esterification with hydroxyl groups on wood chips or via ionic and hydrogen-bonding interactions with functional groups in wood chips. At hot-press temperatures above 160° C., the wet strength of PSF0.15 in the ABES test reached a level acceptable for plywood and particleboard.

Example 2

Plywood Testing Using Adhesive Compositions Comprising Phosphorylated Soy Flours Adhesive Formulations:

Phosphorylated soy flour was made as described in Example 1. The SF adhesive formulations were made by dispersing 25 g of SF in 75 g of water (25% w/w). In the case of PSF0.15, because its ash content was typically about 20.0% due to $Na_3PO_4$ and NaCl formed during the phosphorylation reaction, the PSF0.15 adhesive formulations were made with 32% w/w PSF0.15, so that the final formulations contained ~25% soy flour solids (SFS). The adhesive formulations were mixed thoroughly into a paste and, if needed, the pH was adjusted to ~8.0. When other additives were included in the formulation, their content was based on the w/w basis of the final formulation. See Table 2 for the various adhesive compositions tested.

TABLE 2

Adhesive Formulations

| | Adhesives | | | | | | | | | |
|---|---|---|---|---|---|---|---|---|---|---|
| | SF | | PSF-0.75% $NaClO_2$-1.4% $CaCl_2$ | | | | PSF-1.8% $Ca(NO2)_2$-0.75% EC | | | |
| Component | SF | $H_2O$ | PSF | $NaClO_2$ | $CaCl_2$ | $H_2O$ | PSF | Ca(NO2)2 | EC | H2O |
| Weight, g | 12.5 | 37.5 | 15 | 0.38 | 0.70 | 34 | 15 | 0.9 | 0.37 | 33.7 |
| Percentage | 25% | 75% | 30% | 0.75% | 1.4% | 68% | 30% | 1.8% | 0.75% | 67.4% |
| SF content | | | | | | 25% | | | | |
| Total solids | 25% | | | 32.1% | | | | 32.6% | | |

Adhesion Strength Measurement:

The bonding strength of adhesives in wood veneers was determined using an Automated Bond Evaluation System (ABES) (Model 311c tester, Adhesive Evaluations Systems Inc., Corvallis, Oreg.). Maple veneers (0.8 mm thick; Columbia Forest Products, Old Fort, N.C.) were equilibrated at 21° C. and 50% relative humidity for at least 24 h and cut into strips of 11.7 cm along the grain and 2 cm across the grain. The adhesive was applied to one veneer specimen and then immediately overlapped with another veneer so that the overlap area was 0.5 cm×2.0 cm. The glued area was then hot pressed in the ABES unit at 0.186 MPa and 120° C. (or at other press temperatures) for 2 min. The specimens were then allowed to re-equilibrate at 21° C. and 50% relative humidity for at least overnight before shear strength testing. To measure the dry shear strength, the sample was mounted on the ABES unit and the grips were pulled and the maximum load at failure was recorded. To measure the wet shear strength, the specimens were soaked in tap water for four hours at 21° C. prior to testing on the ABES unit. At least five replicates were performed.

Viscosity:

The viscosity of the adhesives formulations was measured using a Brookfield Ultra Programmable Rheometer, (DV-III-brand, Middleboro, Mass.) at room temperature with spindle #7 at 200 rpm.

Preparation of Three-Ply Plywood Samples:

Yellow poplar veneer (12"×12", moisture content 6.1%, Columbia Forest Products, Old Fort, N.C.) was stored in a room maintained at 27° C. and 30% relative humidity for at least two weeks before use. The adhesive was applied to two sides of a veneer by a roller coater. The spread rate of the adhesive was 21.5-23.7 mg/cm² on a wet weight basis. The adhesive-coated veneer was stacked between two uncoated veneers with grain directions of two adjacent veneers perpendicular to each other. The stacked veneers were placed on a table with a 1 gallon load on the top for 10 min at ambient environment and then cold pressed for 10 min at 0.69 MPa at ambient environment, followed by hot pressing for 6 min at 1.21 MPa and 150° C. The glued panels were stored at 21° C. and 50% RH for at least 48 h, then cut into ten 2"×5" specimens for the three-cycle soak test, and five 1"×3.5" specimens for the shear strength test using a band saw (Craftsman model 137. 224320, Sears Roebuck & Co., Hoffman Estates, Ill). The cut specimens were stored in the conditioning room (21° C. and 50% RH) until the water resistance test.

Water Resistance of the Plywood Samples:

The water-resistance of the glued plywood panels was determined using a three-cycle soak test in accordance with the American National Standard for Hardwood and Decorative Plywood; Hardwood Plywood & Veneer Association protocol (ANSI/HPVA HP-1-2004). Seven plywood specimens (2"×5") were first conditioned in a room maintained at 50% RH and 21° C. for at least 48 h. The specimens were soaked in water at 24±3° C. for 4 h and then dried at 49-52° C. for 19 h. This cycle was repeated three times. After each cycle, the specimens were inspected to see if they de-laminated. According to the ANSI/HPVA HP-1-2004 standard, a plywood panel meets water-resistance requirements for interior applications if 95% of the specimens do not de-laminate after the first soaking/drying cycle, and/or 85% of the specimens do not de-laminate after the third soaking/drying cycle.

The shear strength of the glued plywood specimens was tested according to the ASTM Standard Method D 2339-98 (ASTM, 2202a). The plywood specimens (1"×3.5") were soaked in water at 24±3° C. for 24 h and then immediately submitted to adhesion tensile strength test on an MST Insight Electromechanical (10 KN Standard Length) at a cross-head speed of 5.6 mm/min. The shear strength at maximum load was recorded.

Data Analysis:

All mechanical properties tests were made in quintuplicates. The data were analyzed using the one-way analysis of variance (ANOVA). Either the Tukey-Kramer HSD or Dunnett's method was used to compare the means at 95% confidence limit.

Results and Discussion for Example 2

Figure 7:
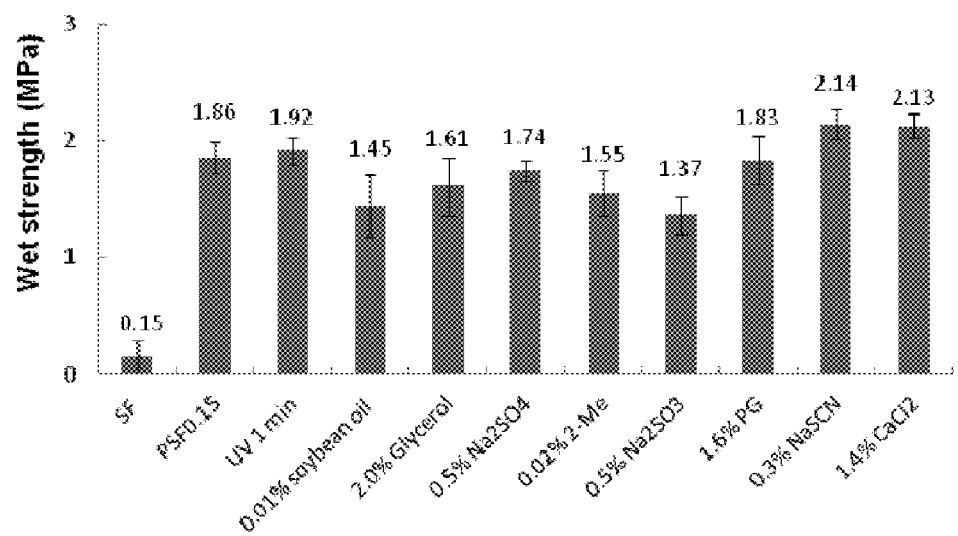
FIG. 7: A histogram depicting the wet strength (MPa) of phosphorylated soy flour adhesives containing various additives.

FIG. 7 shows the wet adhesion strength of various adhesive formulations in the ABES test. The wet adhesion strength of SF was less than 0.2 MPa and the glued veneers essentially fell apart after 24 h soaking in water. On the other hand, the wet adhesion strength of PSF0.15 was about 1.86 MPa. Previously, we determined that SF denatured by incubating at pH 11 and 60° C. for 60 min did not shown any improvement in wet adhesion strength compared to the undenatured SF. (Data not shown.) Thus, while not being limited to any molecular mechanism, the dramatic increase in the wet adhesion strength of PSF0.15 might not be due merely to phosphorylation-induced partial denaturation of the protein, but must be due to direct involvement of the covalently attached phosphate groups in PSF in the bonding mechanism.

Shown also in FIG. 7 are the effects of various additives on the wet adhesion strength of PSF0.15. Exposure to UV irradiation for 1 min, addition of 2% glycerol, 0.5% $Na_2SO_4$, 0.02% 2-mercaptoethanol, 0.5% $Na_2SO_3$, or 1.6% propylene glycol (PG) in the adhesive formulation did not improve the wet adhesion strength of PSF0.15. In fact, adding glycerol, $Na_2SO_4$, 2-mercaptoethanol, and $Na_2SO_3$ caused a reduction in the wet strength. In contrast, addition of NaSCN (0.3%) and $CaCl_2$ (1.4%) did not cause any statistically significant change in the wet strength of PSF0.15.

Effect of Oxidizing Agents:

One of the characteristic features of MAP, which is a complex mixture of proteins, is their high 3,4-dihydroxyphenylalanine (DOPA) content. [14, 31, 32] It is believed that a high content of DOPA side chains in MAPs facilitates adhesion to hydrophilic surfaces via hydrogen bonding interaction. [14, 31, 32] Soy proteins do not contain DOPA, but they contain about 4.0 mol % phenylalanine and 2.5 mol % tyrosine [33], which can be oxidized to DOPA and TOPA (2,4,5-trihydroxyphenylalanine) [34]. Further oxidation of DOPA produces DOPA-quinone residues, which have been shown to facilitate intermolecular cross-linking [35]. Thus, it is possible that chemical oxidation of PSF0.15 using oxidizing agents might further improve its wet adhesion strength. This was tested using $NaClO_2$ and $Ca(NO_2)_2$ as chemical oxidants.

Figure 8:
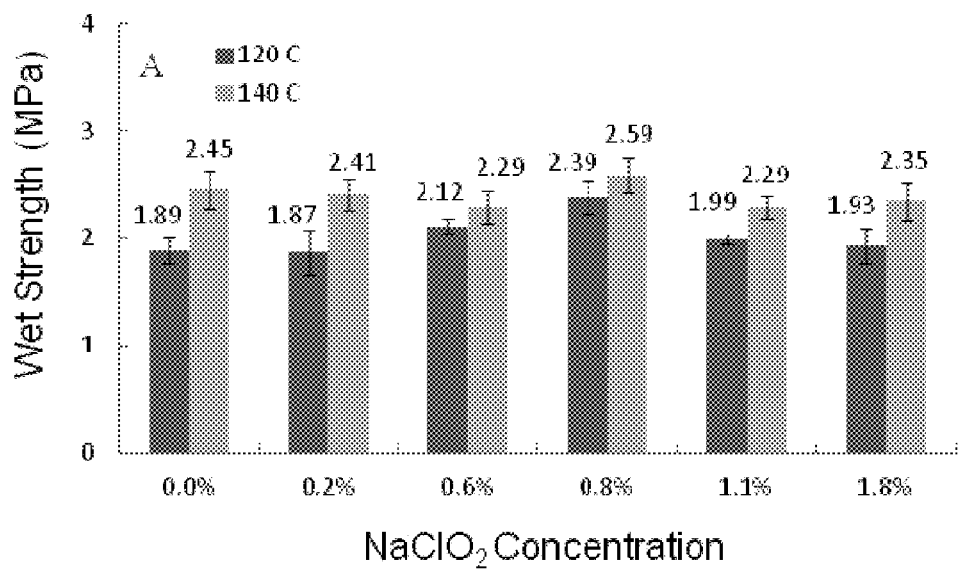
FIG. 8: A histogram showing the effect of $NaClO_2$ on the wet adhesion strength of PSF0.15 at 120° C. and 140° C. hot-press temperatures in the ABES test.

FIG. 8 shows the effect of $NaClO_2$ on the wet adhesion strength of PSF0.15 at 120° C. and 140° C. hot-press temperatures in the ABES test. In these experiments, $NaClO_2$ was added to the adhesive formulation (30% PSF0.15 (equivalent to 25% SF)) and mixed well just prior to pressing. The pressing temperature had a significant effect on the wet adhesion strength of PSF0.15. The adhesion strength of PSF0.15 without any additive increased from 1.89 MPa at 120° C. to 2.45 MPa at 140° C. pressing temperature. At 120° C. hot-press temperature, addition of $NaClO_2$ to the formulation progressively increased the wet adhesion strength until it reached a maximum value of 2.39 MPa at 0.8% $NaClO_2$; however, the wet adhesion strength dropped slightly at higher $NaClO_2$ concentrations. In contrast, $NaClO_2$ addition did not seem to have any significant effect on the wet adhesion strength of PSF0.15 at 140° C. hot-press temperature. Nevertheless, inclusion of 0.8% $NaClO_2$ in the formulation boosted the wet adhesion strength to 2.59 MPa, which was higher than 2.45 MPa without $NaClO_2$ (FIG. 8). The data indicate that oxidation of certain amino acid residues in soy proteins by $NaClO_2$ did improve the wet adhesion strength of PSF0.15, especially at 120° C. hot-press temperature. This might be related to oxidation of several amino acid residues, including tyrosine, cysteine, methionine, and histidine [36]. In addition to creating new bonding groups, the oxidation reaction my cause protein unfolding [34, 37], which might expose additional functional groups for bonding to wood fibers. The drop in the wet adhesion strength at high $NaClO_2$ concentrations might be due to excessive oxidation of certain amino acid residues, which might destroy some of the key functional groups responsible for bonding to wood fibers. Nevertheless, the data clearly suggest that $NaClO_2$'s effect is not greater than the effect of the hot-press temperature.

Figure 9:
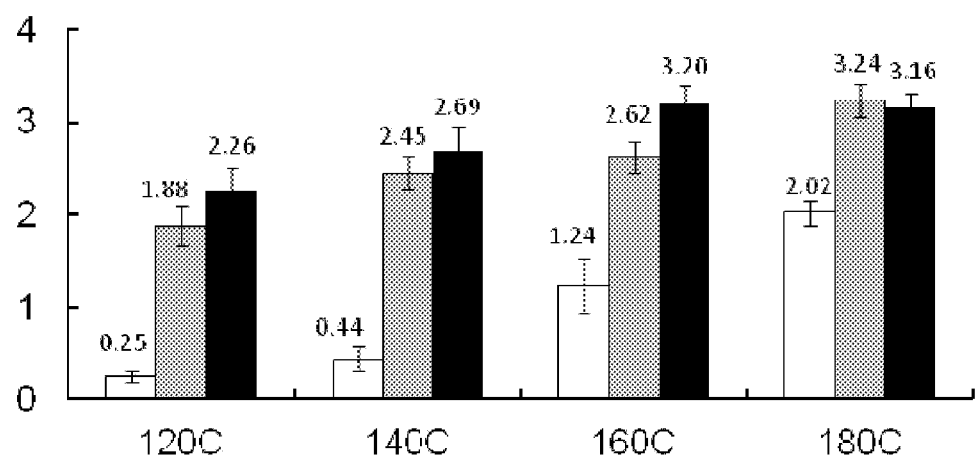
FIG. 9: A histogram showing the effect of hot-press temperature (120° C., 140° C., 160° C., and 180° C.) on the wet adhesion strengths of SF, PSF0.15 and PSF0.15+1.8% $NaClO_2$ adhesive formulations.

The effect of hot-press temperature on the wet adhesion strengths of SF, PSF0.15, and PSF0.15+1.8% $NaClO_2$ adhesive formulations is shown in FIG. 9. The wet adhesion strength of SF increased from 0.25 MPa at 120° C. to about 2 MPa at 180° C. hot-press temperature. On the other hand, the wet adhesion strength of PSF0.15 increased from 1.88 MPa at 120° C. to about 3.24 MPa at 180° C. hot-press temperature. Inclusion of 1.8% $NaClO_2$ in the PSF0.15 adhesive formulation increased the wet adhesion strength from 2.26 MPa at 120° C. to about 3.2 MPa at 160° C. and leveled off above that hot-press temperature. The data indicate that inclusion of 1.8% $NaClO_2$ is quite effective in pushing the wet adhesion strength of the adhesive above the perceived threshold level of 3 MPa in the ABES test for application in interior plywoods.

Figure 10:
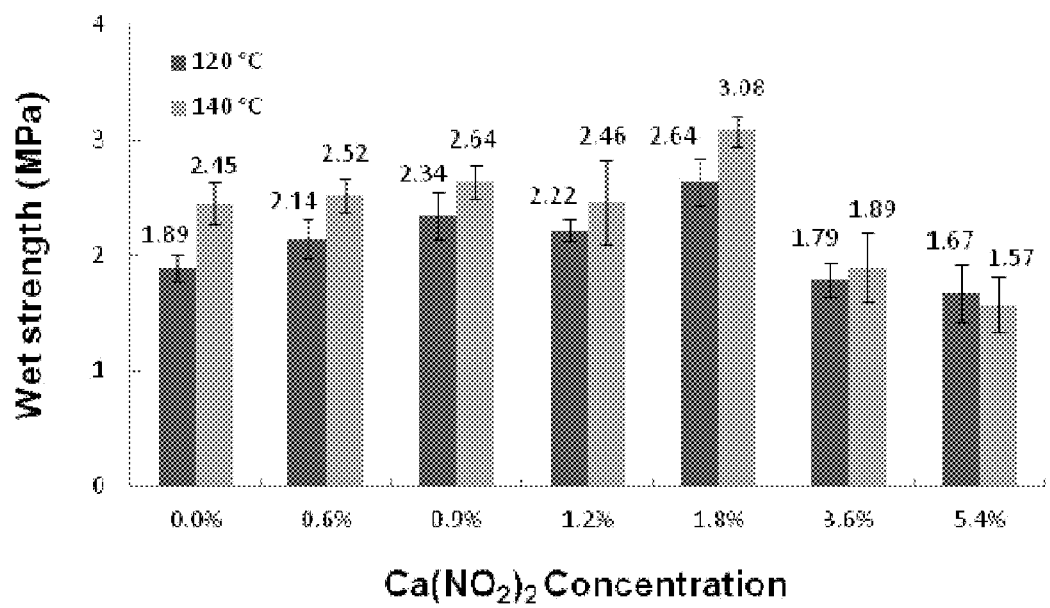
FIG. 10: A histogram showing the effect of $Ca(NO_2)_2$ on the wet adhesion strength of PSF0.15.

The effect of $Ca(NO_2)_2$ on the wet adhesion strength of PSF0.15 is shown in FIG. 10. The wet adhesion strength increased as the $Ca(NO_2)_2$ concentration in the formulation was increased and reached a maximum value of 2.64 MPa and 3.08 MPa, respectively, at 120° C. and 140° C. hot-press temperatures at 1.8% $Ca(NO_2)_2$ concentration; however, the wet strength decreased precipitously at higher $Ca(NO_2)_2$ concentrations. It is notable that the improvement in the wet adhesion strength was significant both at 120° C. and 140° C. hot-press temperatures. The $Ca(NO_2)_2$-induced net increase in the wet adhesion strength of PSF0.15 was about 40% at 120° C. hot-press and about 24% at 140° C. It is notable that inclusion of 1.8% $Ca(NO_2)_2$ in the PSF0.15 formulation pushed the wet strength to above the threshold level of 3 MPa at 140° C. hot-press temperature, which was not the case with the formulation containing $NaClO_2$ (FIG. 9).

Comparison of the data in FIGS. 9 and 10 clearly suggests that $Ca(NO_2)_2$ was more effective than $NaClO_2$ in improving the wet adhesion strength of PSF0.15. This might be related to the greater oxidizing potential of nitrite than chlorite. Nitrites liberate NO and $NO_2$ radicals upon thermal decomposition [38]. Oxidation of tyrosine, phenylalanine, and tryptophan residues by these reactive nitrogen species (RNIs) leads to formation hydroxyl-derivatives (e.g., DOPA) [36] as well as nitration of these residues [36, 39]. It is likely that the decrease in the wet adhesion strength at high $Ca(NO_2)_2$ concentration (FIG. 10) might be due to a greater extent of formation of nitrotyrosines than DOPA and other hydroxyl derivatives of tyrosine, which might not be capable of bonding to wood fibers.

Figure 11:
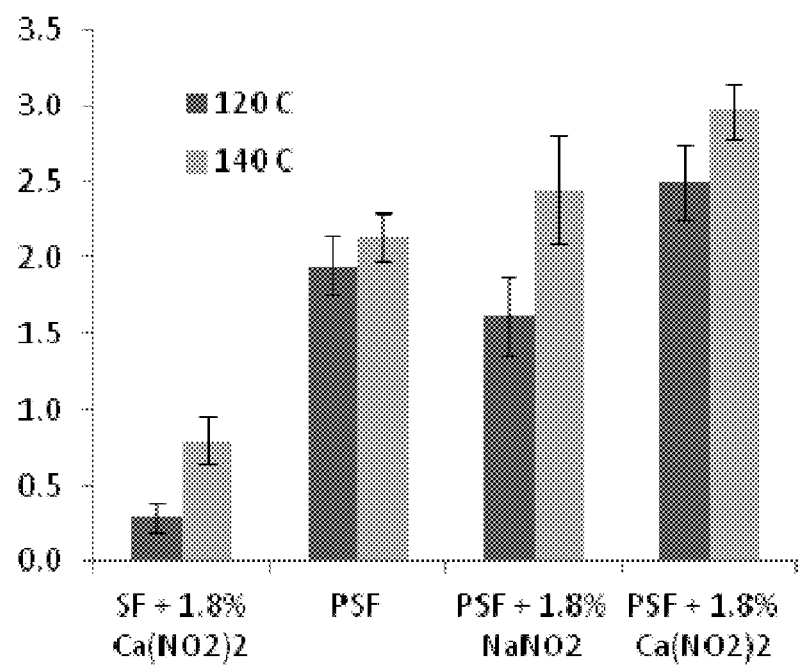
FIG. 11: A histogram showing the effect of adding 1.8 wt % $NaNO_2$ or 1.8 wt % $Ca(NO_2)_2$ in the SF formulation on wet adhesion strength at 120° C. and 140° C. hot-press temperatures.

It should be noted that the wet adhesion strength of SF+1.8% $Ca(NO_2)_2$ formulation was significantly lower than the PSF0.15+1.8% $Ca(NO_2)_2$ formulation at 120° C. and 140° C. hot-press temperatures (FIG. 11), indicating that phosphorylation of SF is critical for maximizing the impact of $Ca(NO_2)_2$ on the adhesion strength. It is also notable that when 1.8% $NaNO_2$ instead of 1.8% $Ca(NO_2)_2$ was used in the formulation, the wet adhesion strength of PSF0.15 was actually lower than the control PSF0.15 at 120° C. hot-press temperature but modestly higher at 140° C. hot-press temperature (FIG. 11), even though the molar concentration of $NO_2^-$ in both cases was almost the same. This suggests that the $Ca^{2+}$ ion in $Ca(NO_2)_2$ also plays a vital role in the bonding mechanism. It is known that both chlorites and nitrites are capable of oxidizing the primary hydroxyl groups (C-6 hydroxyl) in cellulose to carboxylic acids [40, 41]. Thus, $Ca^{2+}$ may contribute to the adhesion strength by forming ionic linkages with the carboxyl and phosphate groups in PSF and carboxyl groups of wood fibers.

Figure 12:
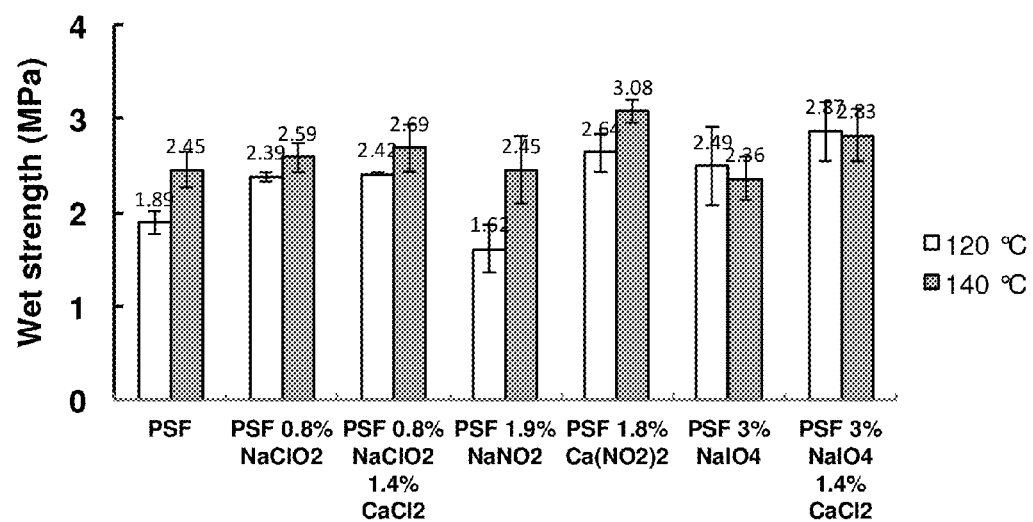
FIG. 12: A histogram showing the effect of various oxidants on the wet adhesion strength of PSF0.15 at 120 and 140° C. hot-press temperatures.

Effect of Various Oxidants in the Presence and Absence of $Ca^{2+}$ on Wet Strength of PSF0.15:

As noted above, $Ca^{2+}$ might play a role in making cross-links by $Ca^{2+}$-bridging. The effect of oxidants in the absence and presence of $Ca^{2+}$ on the wet strength of PSF were investigated. As illustrated in FIG. 12, when hot-pressed at 120° C., the wet strength of the PSF was significantly improved by 26% in the presence of 0.8% $NaClO_2$, 32% in the presence of $NaIO_4$, and 40% in the presence of 1.8% $Ca(NO_2)_2$ in comparison with the PSF alone (1.89 MPa). Addition of 1.4% $CaCl_2$ to the PSF-0.8% $NaClO_2$ formulation did not affect the wet strength. Addition of 1.4% $CaCl_2$ to the PSF-3.0% $NaIO_4$ increased the wet strength by 15%, suggesting that $CaCl_2$ might play a role in making cross-links.

With the same amount of nitrite anion ($NO_2^-$, the wet strength of PSF-1.8% $Ca(NO_2)_2$ formulation was about 63% higher than that of PSF-1.8% $NaNO_2$ formulation. This indicated that in the PSF-1.8% $Ca(NO_2)_2$ system, the presence of $Ca^{2+}$ was very important and $Ca^{2+}$ presumably worked as a crosslinker.

Increasing the hot-press temperature from 120° C. to 140° C. increased the wet strength by 11% for the PSF-0.8% $NaClO_2$-1.4% $CaCl_2$ formulation; by 17% for the PSF-1.8% $Ca(NO_2)_2$ formulation; and no significant increase for the PSF-3% $NaIO_4$-1.4% $CaCl_2$ formulation.

Figure 13:
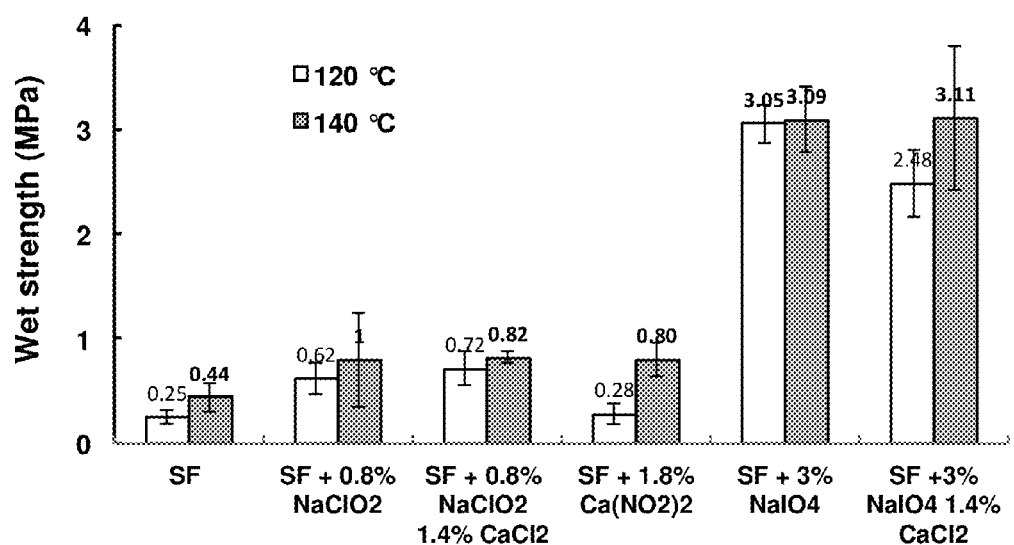
FIG. 13: A histogram showing the effect of various oxidants on the wet adhesion strength of SF at 120 and 140° C. hot-press temperatures.

Even in the presence of 0.8% $NaClO_2$ (120° C.), 0.8% $NaClO_2$+1.4% $CaCl_2$ (120° C.), or 1.8% $Ca(NO_2)_2$ (120° C. and 140° C.), the wet strength of SF (25%) was very low (<1 MPa). See FIG. 13. This again confirms that phosphorylation plays a vital role in improving the wet adhesion strength of SF. However, adding 3.0% $NaIO_4$ caused a remarkable increase in the wet strength of SF even without phosphorylation. However, the high cost of $NaIO_4$ may be prohibitive for using it as an oxidant in commercial soy flour-based wood adhesive.

Figure 14:
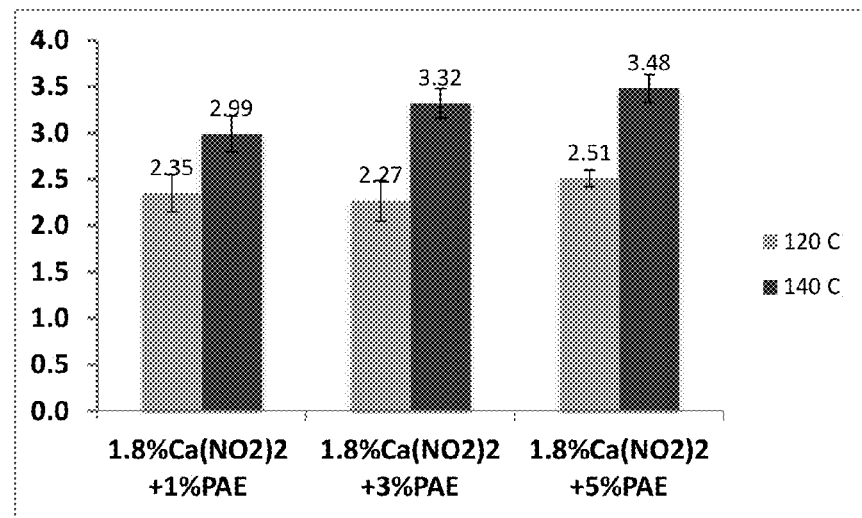
FIG. 14: A histogram showing the effect of increasing concentration of PAE on the wet adhesion strength of PSF0.15 containing 1.8 wt % $Ca(NO_2)_2$ (120° C. and 140° C. hot-press temperatures).

Adding PAE to the 1.8% $Ca(NO_2)_2$-PSF0.15 composition (at 1%, 3%, and 5%) had negligible effect on wet adhesion strength, at either 120° C. and 140° C. See FIG. 14. Regardless of $CaCl_2$, all the oxidants, except PSF-1.9% $NaNO_2$, resulted in insignificant difference on the wet strength of PSF0.15.

The three oxidants: chlorite, nitrite, and periodate, had similar additive effect on improving the wet strength of PSF0.15 either at 120° C. or 140° C.; while chlorite and nitrite had no impact on the wet strength of SF but periodate did. Comparatively, periodate functioned more efficiently in increasing the wet strength of SF than that of PSF.

$NaIO_4$, like $NaClO_2$ and $NaNO_2/Ca(NO_2)_2$, produced DOPA and DOPA quinone as a protein cross-linking agent by oxidizing proteins (Leatham et al., 1980). Out of the same mechanism, it was not a surprise that all three oxidants had similar impact on the wet strength of PSF. Chlorite and nitrite made no impact on the wet strength to SF, but periodate did because periodate is a much potent oxidizer than chlorite and nitrite. However, sodium periodate is very expensive and the use of this oxidant may be cost prohibitive for soy flour-based wood adhesives.

Figure 15:
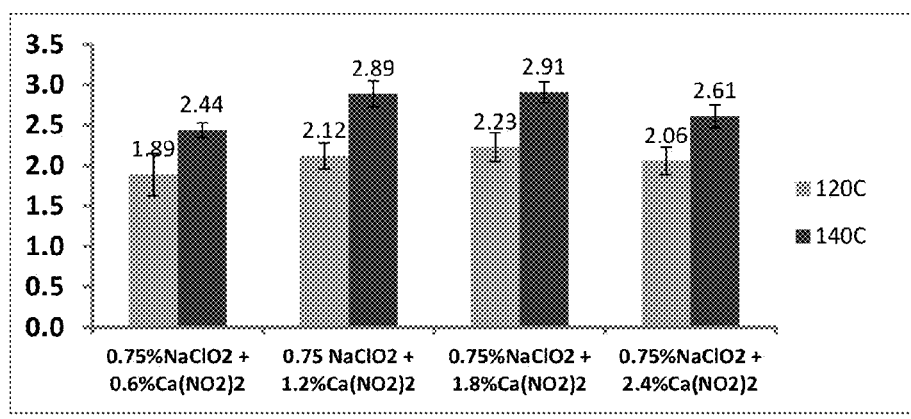
FIG. 15: A histogram showing the effect of different ratios of $NaNO_2$ to $Ca(NO_2)_2$ in the SF formulation on wet adhesion strength at 120° C. and 140° C. hot-press temperatures.

As shown in FIG. 15, adding various ratios of $NaClO_2$ and $Ca(NO_2)_2$ had very little effect on the wet adhesion strength of PSF0.15 at either 120° C. or 140° C.

Figure 16:
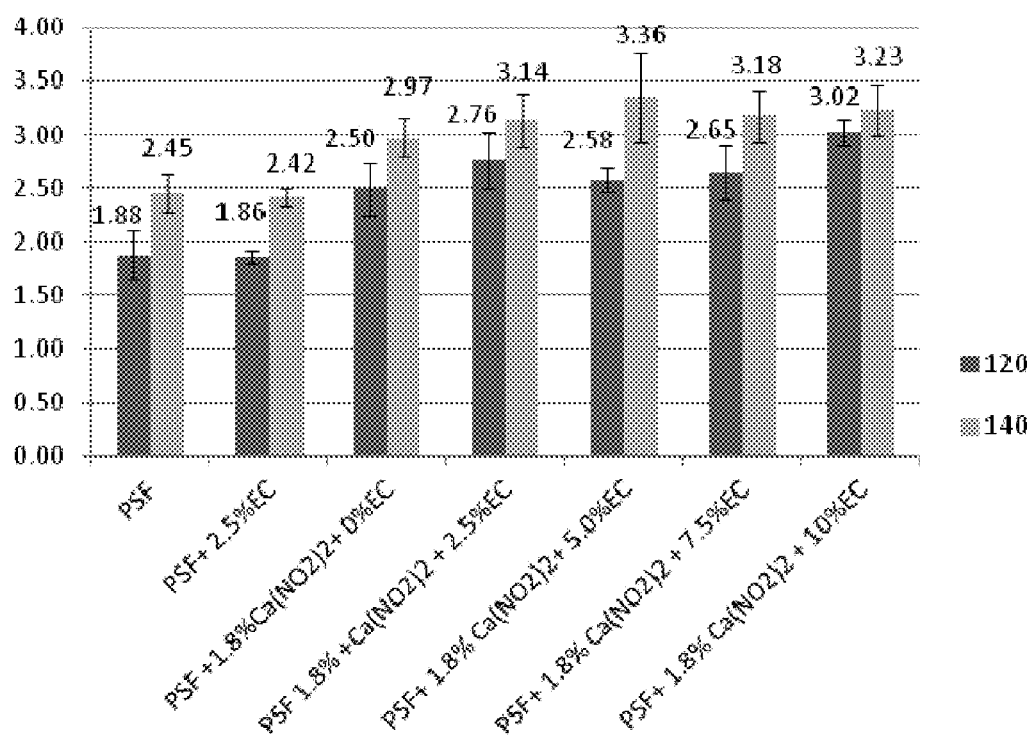
FIG. 16: A histogram showing the effect of various additives to the PSF formulation on wet adhesion strength at 120° C. and 140° C. hot-press temperatures.

Effect of Ethylene Carbonate (EC) Concentration on Wet Strength of PSF in the Presence of $Ca(NO_2)_2$:

Ethylene carbonate (EC) is able to react with the ε-$NH_2$ of lysine residues at alkaline condition and the hydroxyl groups of carbohydrates upon the opening of EC ring. The impact of EC on the wet strength of PSF0.15 with 1.8% $Ca(NO_2)_2$ was examined as shown in FIG. 16. Regardless of hot-press temperature, adding 2.5%-10% EC resulted in insignificant difference on wet strength of the PSF0.15-1.8% $Ca(NO_2)_2$. This might be due to the depletion of —$NH_2$ groups of lysine residue during phosphorylation, which would leave only a limited number of —$NH_2$ groups available for EC to produce cross-linking.

Water Resistance of Three-Ply Plywood:

The water-resistance of plywood panels glued with various PSF0.15 formulations in the standard three-cycle soak test is shown in Table 3. All the specimens with the SF adhesive failed after first soak/dry cycle, while all specimens with the PSF0.15-0.8% $NaClO_2$-1.4% $CaCl_2$ and PSF0.15-1.8% $Ca(NO_2)_2$-0.75% EC formulations passed the first soak/dry cycle. After third soak/dry cycle, all the specimens with the adhesive PSF-0.8% $NaClO_2$-1.4% $CaCl_2$ formulation failed, while only one of the seven specimens delaminated in the case of the PSF0.15-1.8% $Ca(NO_2)_2$-0.75% EC adhesive formulation. According to the ANSI/HPVA HP-1 standard, the adhesive PSF-1.8% $Ca(NO_2)_2$-0.75% EC was suitable for use in interior type II plywood.

Figure 17:
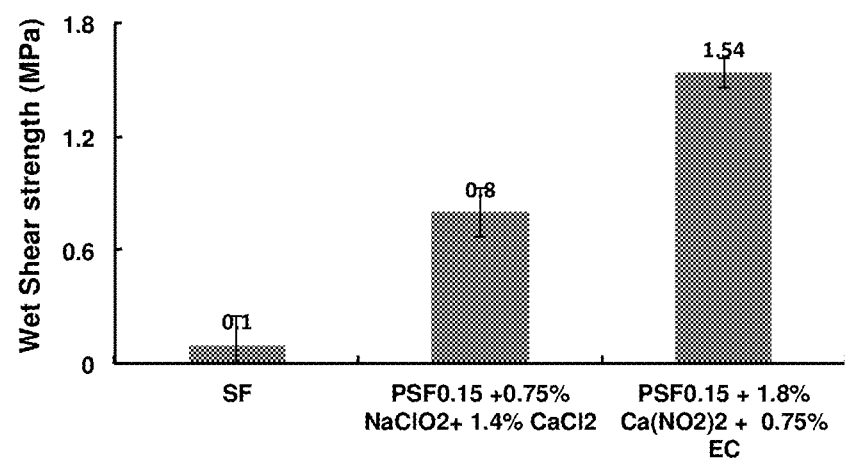
FIG. 17: A histogram showing the wet shear strength of various adhesive formulations.

Although there are no shear strength requirements for interior type II plywood according to the ANSI/HPVA HP-1 standard, the wet shear strength of three-ply plywood bonded with the various adhesives (Table 3) were measured (FIG. 17). After 24 h soaking at room temperature, the wet shear strength of the three-ply plywood was 1.54 MPa for the PSF-1.8% $Ca(NO_2)_2$-0.75% EC formulation; 0.8 MPa for the PSF-0.8% $NaClO_2$-1.4% $CaCl_2$ formulation; and 0.1 MPa for the SF only formulation. For the adhesive PSF-0.8% $NaClO_2$-1.4% $CaCl_2$, it may need much higher hot press temperature, such as 180° C., or high pressure (higher than 1.21 MPa) or much longer press time (more than 6 min) to improve its water resistance.

TABLE 3

Water resistance of three-ply plywood panels bonded with various adhesives formulations.

| Adhesives | Number of Specimens failed in three-cycle soak test | | |
|---|---|---|---|
| | $1^{st}$ cycle | $2^{nd}$ cycle | $3^{rd}$ cycle |
| SF | 7/7 | 7/7/ | 7/7 |
| PSF—0.75% NaClO2—1.4% CaCl2 | 0/7 | 3/7 | 7/7 |
| PSF—1.8% Ca (NO2)2—0.75% EC | 0/7 | 0/7 | 1/7 |

REFERENCES CITED

The following documents are incorporated herein by reference.

[1] California Air Resources Board. 2007. Proposed airborne toxic control measure to reduce formaldehyde emissions from composite wood products.
[2] Liu Y, Li K. Macromol Rapid Commun 2002; 23:730.
[3] Wescott J M, Frihart C R, Traska A E. J Adhesion Sci Technol 2006; 20:859.
[4] Liu Y, Li K. Macromol Rapid Commun 2004; 25:1835.
[5] Liu Y, Li K. Int J Adhesion & Adhesives 2007; 27:59.
[6] Huang J, Li K. J Amer Oil Chem Soc 2008; 85:63.
[7] Jang Y, Huang J, Li K. Int J adhesion & adhesives 2011; 31:754.
[8] Huang J, Li C, Li K. Holzforschung 2012; 66:427.
[9] Li K. U.S. Pat. No. 7,252,735, 2007.
[10] Li K, Peshkova S, Gen X. J Amer Oil Chem Soc 2004; 81:487.
[11] Wescott J, Frihart C R. Chemistry & Industry 2011; Feb. 7: 21.
[12] Stewart R J, Weaver J C, Morse D E, Waite J H. J Exp Biol 2004; 207:4727.

[13] Zhao H, Sun C J, Stewart R J, Waite J H. J Biol Chem 2005; 280:42938.
[14] Sun C J, Srivastava A, Reifert J R, Waite J H. J Adhes 2009; 85:126.
[15] Woo S L, Creamer L K, Richardson T. J Agric Food Chem 1982; 30:65.
[16] Damodaran S, Kinsella J E. J Agric Food Chem 1984; 32:1030.
[17] Hall R J, Trinder N, Givens D I. Analyst 1973; 98:673.
[18] Hirotsuka M, Taniguchi H, Narita H, Kito M. Agric Biol Chem 1984; 48:93.
[19] Matheis G. Food Chem 1991; 39:13.
[20] Choct M, Dersjant-Li Y, McLeish J, Peisker M. Asian-Aust J Anim Sci 2010; 23:1386.
[21] Frihart C R. 2005. In: Rowell R M, editor. Handbook of wood chemistry and wood composites. Boca Raton, La., USA: CRC Press; 2005. Pp. 215-278.
[22] Suflet D M, Chitanu G C, Popa V I. Reactive & Functional Polymers 2006; 66:1240.
[23] Iman M, Maji T K. J Applied Polymer Sci 2012; 27:3987.
[24] Xie W, Shao Li. Starch 2009; 61:702.
[25] Bock J E, Damodaran S. Food Hydrocolloids 2013; 31:146.
[26] Lee H L, Chen G C, Rowell R M. Taiwan Forestry Sci 2000; 15:137.
[27] Kitabatake N, Tahara M, Doi E. Agric Biol Chem 1990; 54:2205.
[28] Hwang D C, Damodaran S. J Agric Food Chem 1996; 44:751.
[29] Hwang D C, Damodaran S. J Applied Polymer Sci 1996; 62:1285.
[30] Hwang D C, Damodaran S. J Applied Polymer Sci 1997; 64:891.
[31] Danner, E. W.; Kan, Y.; Hammer, M. U.; Israelachvili, J. N.; Waite, J. H. Biochemistry 2012, 51, 6511-6518.
[32] Wei, W.; Yu, J.; Broomell, C.; Israelachvili, J. N.; Waite, J. H. J. Am. Chem. Soc. 2013, 135, 377-383.
[33] Utsumi, S.; Matsumura, Y.; Mori, T. In Food Proteins and their Applications, (Damodaran, S.; Paraf, A.; Eds.); Marcel Dekker, Inc., New York, 1997; pp. 257-291.
[34] Ogata N. Biochemistry 2007, 46, 4898-4911.
[35] Haemers S.; van der Leeden M. C.; Koper G. J. M.; Ferns G. Langumir, 2002, 18, 4903-4907.
[36] Dean, R. T.; Fu, S.; Stocker, R.; Davies, M. J. Biochem. J. 1997, 324, 1-18.
[37] Chapman A. L. P., Winterbourn C. C., Brennan S. O., Jordan T. W., Kettle A. J. Biocehm. J. 2003, 375, 33-40.
[38] Bulla, L. A.; Gilmour, C. M.; Bollen, W. B. Nature 1970, 225, 664.
[39] Bian K.; Gao Z.; Weisbrodt N.; Murad F. Proc. Natl. Acad. Sci. USA 2003, 100, 5712-5717.
[40] Pagliaro M. Carbohydr. Res. 1998, 308, 311-317.
[41] Kumar V.; Yang T. Carbohydrate Polym. 2002, 48, 403-412.

What is claimed is:

1. An adhesive composition comprising:
water and at least one flour selected from the group consisting of legume flour, oil seed flour, and combinations thereof in which at least a portion of $\epsilon$-amino moieties in lysine residues present in the flour are phosphorylated.

2. The adhesive composition of claim 1, wherein at least 50% of the lysine residues present in the flour are phosphorylated.

3. The adhesive composition of claim 1, wherein at least 60% of the lysine residues present in the flour are phosphorylated.

4. The adhesive composition of claim 1, wherein at least 70% of the lysine residues present in the flour are phosphorylated.

5. The adhesive composition of claim 1, wherein at least 80% of the lysine residues present in the flour are phosphorylated.

6. The adhesive composition of claim 1, wherein at least 90% of the lysine residues present in the flour are phosphorylated.

7. The adhesive composition of claim 1, further comprising an oxidizing agent.

8. The adhesive composition of claim 7, wherein the oxidizing agent comprises or yields upon being added to aqueous solution a halite ion, halate ion, perhalate ion, hypohalite ion, nitrate ion, or nitrite ion.

9. The adhesive composition of claim 8, wherein the oxidizing agent comprises or yields upon being added to aqueous solution a chlorite ion, chlorate ion, perchlorate ion, hypochlorite ion, nitrate ion, or nitrite ion.

10. The adhesive composition of claim 8, wherein at least 50% of the lysine residues present in the flour are phosphorylated.

11. The adhesive composition of claim 8, wherein at least 60% of the lysine residues present in the flour are phosphorylated.

12. The adhesive composition of claim 8, wherein at least 70% of the lysine residues present in the flour are phosphorylated.

13. The adhesive composition of claim 8, wherein at least 80% of the lysine residues present in the flour are phosphorylated.

14. The adhesive composition of claim 8, wherein at least 90% of the lysine residues present in the flour are phosphorylated.

15. The adhesive composition of claim 8, wherein at least one flour comprises a flour selected from the group consisting of bean flour, pea flour, peanut flour, flax seed flour, canola seed flour, sesame seed flour, safflower seed flour, and sunflower seed flour.

16. The adhesive composition of claim 1, wherein at least a portion of salts formed as a result of phosphorylation of the flour is removed from the adhesive composition.

17. The adhesive composition of claim 1, wherein at least one flour comprises a flour selected from the group consisting of bean flour, pea flour, peanut flour, flax seed flour, canola seed flour, sesame seed flour, safflower seed flour, and sunflower seed flour.

18. A method of making an adhesive composition comprising phosphorylating at least one flour selected from the group consisting of legume flour, oil seed flour, and combinations, to yield phosphorylated flour and fabricating an aqueous-based adhesive composition from the phosphorylated flour.

19. The method of claim 18, comprising phosphorylating at least 50% of lysine residues present in the flour.

20. The method of claim 18, comprising phosphorylating at least 60% of lysine residues present in the flour.

21. The method of claim 18, comprising phosphorylating at least 70% of lysine residues present in the flour.

22. The method of claim 18, comprising phosphorylating at least 80% of lysine residues present in the flour.

23. The method of claim 18, comprising phosphorylating at least 90% of lysine residues present in the flour.

24. The method of claim 18, further comprising adding an oxidizing agent to the composition.

25. The method of claim 18, wherein the oxidizing agent comprises or yields upon being added to aqueous solution a halite ion, halate ion, perhalate ion, hypohalite ion, nitrate ion, or nitrite ion.

26. The method of claim 25, wherein the oxidizing agent comprises or yields upon being added to aqueous solution a chlorite ion, chlorate ion, perchlorate ion, hypochlorite ion, nitrate ion, or nitrite ion.

* * * * *